United States Patent [19]

Brearley et al.

[11] Patent Number: 5,080,445
[45] Date of Patent: Jan. 14, 1992

[54] TRAILER BRAKE CONTROL FOR TOWING VEHICLES HAVING ELECTRONIC BRAKE CONTROL

[75] Inventors: Malcolm Brearley, Solihull; Richard B. Moseley, Leamington Spa, both of England

[73] Assignee: Lucas Industries public limited company, Birmingham, England

[21] Appl. No.: 437,754

[22] Filed: Nov. 17, 1989

[30] Foreign Application Priority Data

Nov. 19, 1988 [GB] United Kingdom ............... 8827101

[51] Int. Cl.$^5$ .............................................. B60T 13/00
[52] U.S. Cl. ........................................... 303/7; 303/15
[58] Field of Search ................ 303/7, 15, 20, 22.1; 188/3 R, 112

[56] References Cited

U.S. PATENT DOCUMENTS

| | | | |
|---|---|---|---|
| 3,981,542 | 9/1976 | Abrams et al. | 188/3 R |
| 4,553,788 | 11/1985 | Smith | 303/7 |
| 4,616,881 | 10/1986 | Müller et al. | 303/7 |
| 4,629,256 | 12/1986 | Fannin | 303/7 |
| 4,712,839 | 12/1987 | Brearley et al. | 303/15 |
| 4,768,840 | 9/1988 | Sullivan et al. | 303/22.1 |

Primary Examiner—Matthew C. Graham
Attorney, Agent, or Firm—Oblon, Spivak, McClelland, Maier & Neustadt

[57] ABSTRACT

An electronic braking system in a motor vehicle capable of towing a standard trailer not having its own EBS system has a separate pressure control channel for the generation of a trailer service brake pressure signal in the event that a driver's braking demand is sensed at any axle of the towing vehicle. The pressure signal level is set in the towing vehicle so as to be a function of the driver's electrical demand signal modified in dependence upon the load exerted by the trailer on the towing vehicle as measured at a towing link therebetween. Separate adaptive loops are provided in respect of the towing vehicle braking and the trailer braking, with the towing vehicle adaptive loop being responsive to deceleration error established by a comparison of vehicle retardation against driver braking demand, and with the trailer adaptive loop being responsive to towing link load, such as to obtain error signals which cause the adaptive adjustments to be made in the two loops in a mutually co-ordinated manner in order to achieve the required overall vehicle retardation.

9 Claims, 7 Drawing Sheets

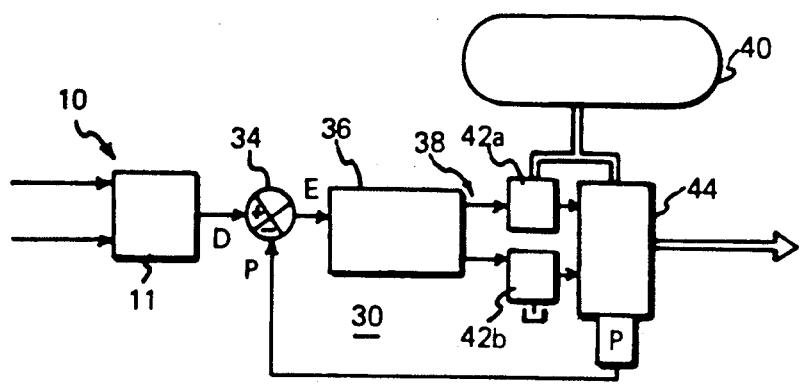
Fig_2.
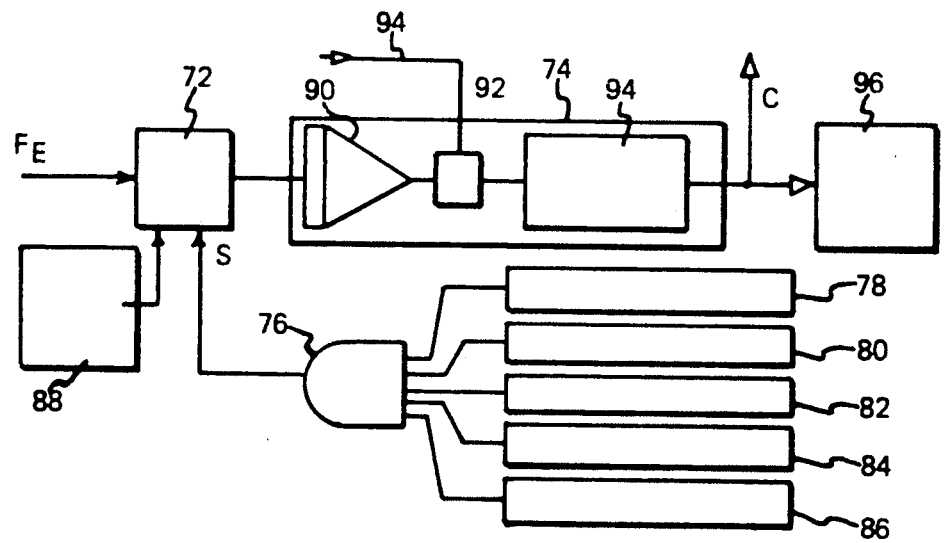
Fig_3.

| VEHICLE RETARDATION | TOWING LINK LOAD | ACTION | |
|---|---|---|---|
| | | TOWING VEH. | TRAILER |
| LOW | TENSION | BOOST | HOLD |
| | NEUTRAL | BOOST | BOOST |
| | COMPRESSION | HOLD | BOOST |
| HIGH | TENSION | HOLD | REDUCE |
| | NEUTRAL | REDUCE | REDUCE |
| | COMPRESSION | REDUCE | HOLD |

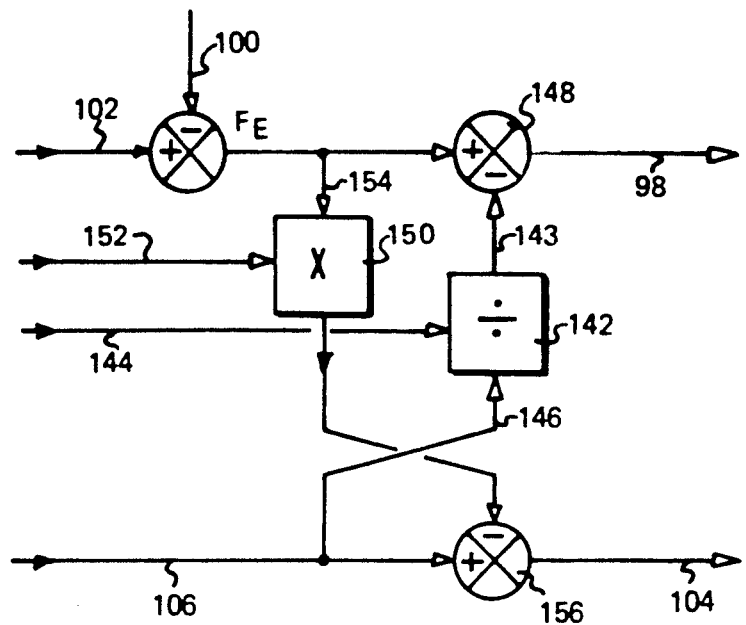
Fig_7.
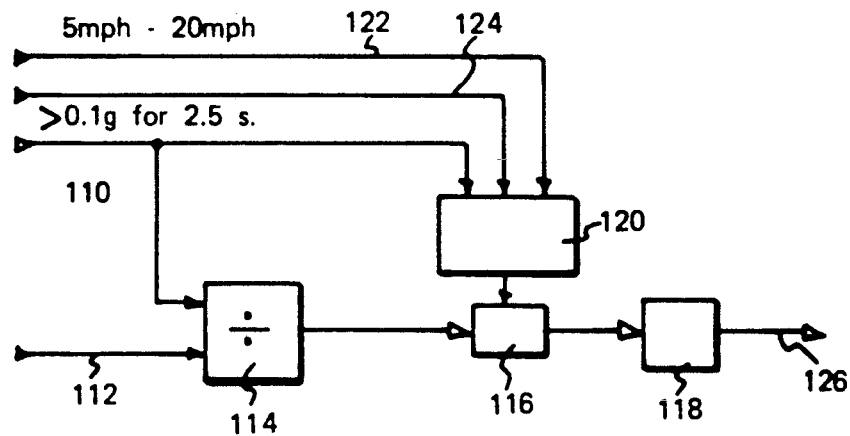
Fig_9.

| DECEL. DEMAND %g | VEHICLE SPEED (AT START OF STOP) | | | | |
|---|---|---|---|---|---|
| | <20 KPH | 20 - 40 KPH | 40 - 60 KPH | 60 - 80 KPH | >80 KPH |
| 0 - 20% | KA1.1 | KA1.2 | KA1.3 | KA1.4 | KA1.5 |
| 20 - 40% | KA2.1 | KA2.2 | KA2.3 | KA2.4 | KA2.5 |
| 40 - 60% | KA3.1 | KA3.2 | KA3.3 | KA3.4 | KA3.5 |
| 60%+ | KA4.1 | KA4.2 | KA4.3 | KA4.4 | KA4.5 |

Fig 10.

TRAILER BRAKE CONTROL FOR TOWING VEHICLES HAVING ELECTRONIC BRAKE CONTROL

DESCRIPTION

The present invention relates to electronic brake control (EBS) systems and is concerned in particular with the control, in towing vehicles having EBS facilities, of standard trailers, i.e. ones that are not themselves fitted with their own EBS system.

In such arrangements, the braking demand signalling to the trailer, which is coupled to the towing vehicle by a towing link, is in the form of a pneumatic pressure signal which is usually provided by the EBS system on the towing vehicle. This trailer brake demand pressure has to be adjusted to suit the operating conditions encountered by both the towing vehicle and the trailer.

An apparatus is known from EP 301018 in which the force exerted on a coupling link between a motor-driven vehicle (tractor) and a towed trailer is measured by means of a force sensor disposed in the coupling link. The measured value is applied to a servo mechanism which automatically adjusts the brakes solely of the trailer vehicle using an error signal formed from the magnitude and direction of the force at the coupling link between the tractor and trailer.

Whilst the known system of EP 301018 is an improvement on the basic trailer systems in which there is no feedback between the towing vehicle and the braking system, there are still problems associated with this known system in that, as described in more detail hereinafter, attempting to correct certain error situations solely by increasing or decreasing the braking effort at the trailer will not provide means for obtaining the required braking conditions for the linked vehicle as a whole. It is an object of the present invention to provide a control system on the towing vehicle wherein the control of the trailer braking is optimised.

In accordance with the present invention, there is provided an electronic braking system in a motor vehicle capable of towing a standard trailer not having its own EBS system, the system having a separate pressure control channel for the generation of a trailer service brake pressure signal in the event that a driver's braking demand is sensed at any axle of the towing vehicle, the pressure signal level being set in the towing vehicle so as to be a function of the driver's electrical demand signal modified in dependence upon the load exerted by the trailer on the towing vehicle as measured at a towing link therebetween, characterised in that separate adaptive loops are provided in respect of the towing vehicle braking and the trailer braking, the towing vehicle adaptive loop being responsive to deceleration error established by a comparison of vehicle retardation against driver braking demand, and the trailer adaptive loop being responsive to towing link load, such as to obtain error signals which are arranged to cause the adaptive adjustments to be made in the two loops in a mutually co-ordinated manner in order to achieve the required overall vehicle retardation.

In one embodiment, in the trailer adaptive loop, the trailer service brake pressure demand is multiplied by a "trailer brake factor" stored in system memory and adapted over a series of stops from a preset nominal value so as to generate a level of braking on subsequent stops in which the towing link is maintained in slight tension but wherein this adjustment is made in conjunction with adaptive adjustment being made to the towing vehicle adaptive braking loop so that the loops are adjusted to give the required vehicle retardation in addition to the slight towing link tension.

Advantageously, large towing link loads which indicate very serious imbalance between trailer and towing vehicle braking levels are arranged to cause emergency adjustment of the appropriate adaptive loop to be made during the stop in order to bring about a more acceptable balance condition without having to wait for the normal gradual adjustment to occur over several stops.

The invention is described further hereinafter, by way of example only, with reference to the accompanying drawings, wherein:

FIG. 2 is a schematic view of one embodiment of a basic pressure control loop used in the system of FIG. 1;

FIG. 3 is a schematic view of one embodiment of a basic adaptive brake control loop used in the system of FIG. 1;

FIG. 7 shows more detail of one possible embodiment of the two adaptive control loops of FIG. 5;

FIG. 9 is a schematic diagram of a trailer mass detector used in the present system; and FIG. 10 is a table illustrating the establishment of an array of adaptive constants.

Figure 1:
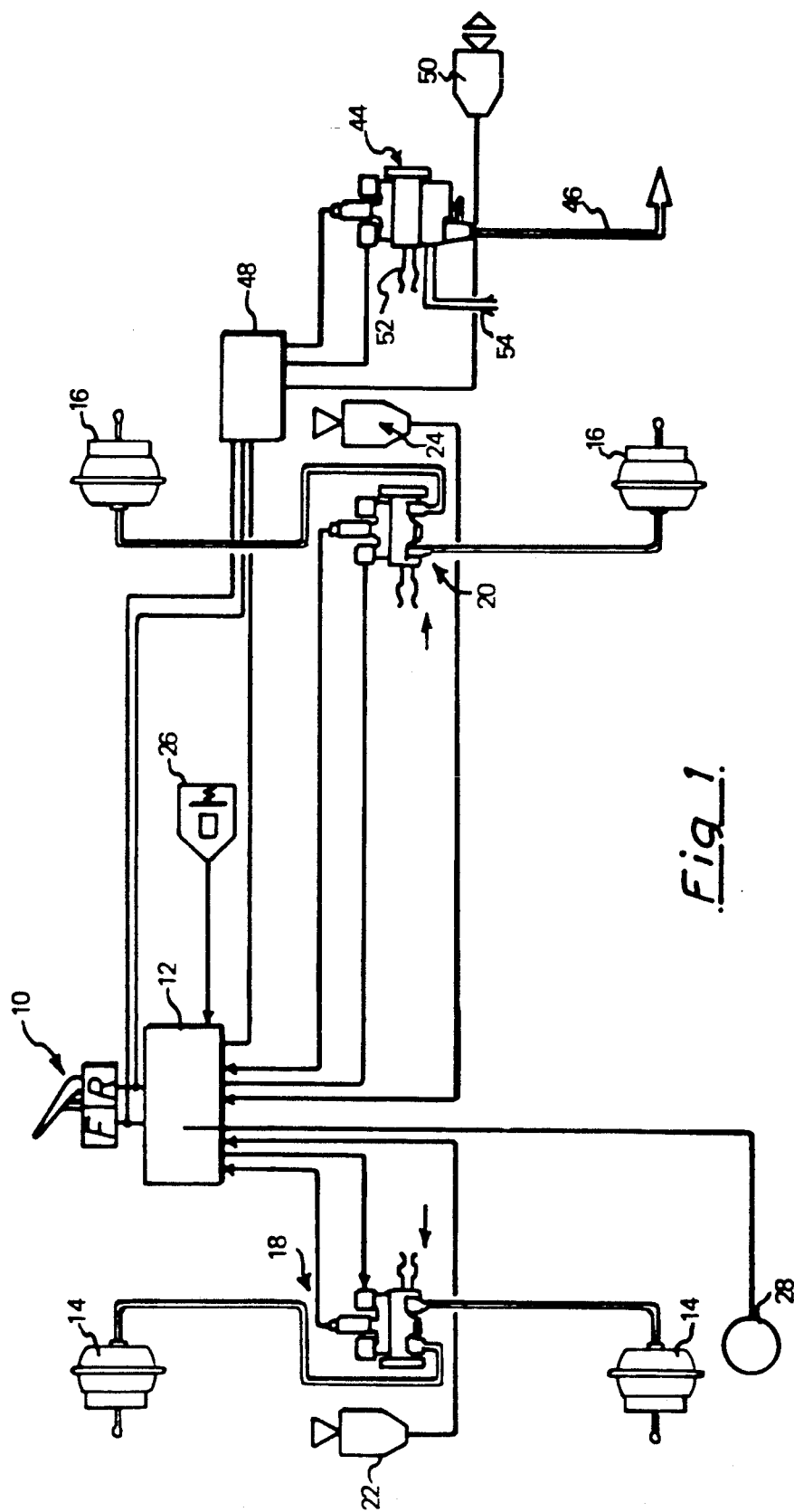
FIG. 1 is a schematic view of one embodiment of a vehicle braking system adapted to be fitted with an axle controlled EBS system in accordance with the present invention for controlling the braking signals supplied pneumatically to a standard trailer (not shown)

FIG. 1 illustrates, inter alia, the main components of a conventional electronic braking system (EBS) which is not described in detail herein. Driver's braking demand signals are generated electrically by a treadle-operated transducer arrangement 10 and supplied to an electronic controller 12 where front and rear braking pressures are established and fed to front and rear brake actuators 14,16 via respective relay valves 18,20. The braking pressures depend upon operating parameters of the vehicle determined, inter alia, by front and rear load sensors 22,24, a vehicle decelerometer 26 and a speed sensor 28.

It is known from our prior European Application No.205277 (to which reference is hereby directed) that improved braking characteristics can be obtained in the electronic braking system of a motor-driven vehicle by incorporating means for modifying braking performance to take account of dynamic operating factors, such as vehicle load and road gradient. In this known system, vehicle load measurements, made dynamically, are used to modify the braking demand, individually for each axle of the vehicle and, under predetermined conditions of vehicle speed, braking level and operating gradient, the deceleration error formed between braking demand by the driver and measured actual vehicle deceleration is used gradually, over a number of vehicle stops, to form an adaptive factor for correcting the braking demand in order to restore expected braking performance. No correction to the adaptive factor based on the deceleration error is made during a given stopping operation of the vehicle, but a summation of previous errors is arranged to cause a small increment in correction to be made after each stop until, over a number of vehicle stops, the error formed under the predetermined conditions falls to zero.

A motor-driven vehicle having a braking system which operates in accordance with the aforegoing principles is described hereinafter as having "adaptive" braking.

In an adaptive braking system, the foot pedal transducer 10 generates a first signal indicating the braking level desired by the driver and additional sensors measure the vehicle axle loads (sensors 22,24 in FIG. 1) and the operating gradient. The system makes appropriate open loop corrections to the brake pressure demands being interpreted from the driver pedal input, with the aim of restoring the vehicle deceleration to be fixed in proportion to the driver's demand.

Referring now to FIG. 2, there is shown a known system which employs a pressure control loop 30 taking an input D, via a "select highest" element 11, from a duplex brake pedal transducer 10 which is used to provide a pressure error signal E by comparison in an adder/subtractor 34 with a pressure transducer output signal P, this pressure error E forming the input to a pressure controller 36 which generates an output signal which causes the pressure developed by an electropneumatic or electro-hydraulic converter 38 to change in a direction such as to reduce the amplitude of the pressure error E. Pneumatic or hydraulic pressure medium is stored in a reservoir 40.

The nature and circuit of such a pressure controller 36 depends upon the type of converter 38 employed. Two such converter principles are well known, namely an analogue system in which a valve is employed with pressure output developed proportional to solenoid current and a digital system, as shown in FIG. 2, in which a pair of simpler solenoid valves 42a, 42b are employed to raise or lower a control chamber pressure by selective energisation. One form of pneumatic converter employs a relay valve 44 which responds to this control chamber pressure and which rebalances into the closed condition when the brake pressures at the brake actuators 14,16 of the vehicle become equal to this control pressure. Such a valve 44 has an advantage in that the control chamber pressure responds rapidly to valve opening, giving a fast control loop which is accurate and responsive.

As explained in more detail in our aforementioned European Application No. 205277, adaptation of the braking performance takes place after every significant stop (of reasonable deceleration level). Achieved deceleration is compared in an adaptive loop with the deceleration level demanded by the driver via the foot pedal 10. As indicated schematically in FIG. 3 of the present drawings, the resulting deceleration error $F_E$, calculated from the difference, is integrated throughout the stop. At the end of the stop, the average error is formed and the figure for this average error is then integrated into an adaptive constant which is gradually built up over a series of stops. Because of quite considerable non-linearites which relate braking torque to actuator pressure at different speeds, and since these relationships are generally unknown, a single adaptive constant in some cases is insufficient. In such cases, where braking relationships are significantly non-linear the single adaptive constant may be expanded into an adaptive array of constants based on speed and deceleration. Since the brakes are being adjusted by a control system which is largely implemented in computer software, a single adaptive constant can easily be replaced by an array of constants split up by the vehicle speed when braking is first called for and by the demanded deceleration being requested by the driver's pressure on the brake pedal. a typical array of constants can be established in dependence upon vehicle speed and deceleration demand, as illustrated by way of example in FIG. 10.

The adaptive constant (or array of constants) is reduced to a suitable fraction of the integrated value or values and is applied into a system scaling multiplier (described more fully in European 205277) where it modifies the relationship between compensated driver's demand and corresponding towing vehicle braking pressure demand.

Referring to FIG. 3, a controllable switch 72 is adapted to permit the passage of the deceleration error $F_E$ to a long term adaptive constant calculating means 74 only when a control signal S from a gate 76 indicates the receipt of signals from a sensor 78 responsive to the demand being greater than a first predetermined level, a sensor 80 responsive to the gradient being in a zero band, a sensor 82 responsive to the speed being greater than a first predetermined threshold, a sensor 84 responsive to the demand being less than a second predetermined level and a sensor 86 responsive to the vehicle speed being less than a second predetermined threshold. In the absence of the signals, the switch 72 inhibits the deceleration error $F_E$ from reaching the circuit 74. The switch 72 also inhibits the deceleration error on receipt of a signal from an anti-lock (ABS) detection means 88.

The long-term adaptive constant producing means 74 includes a very slow integrating means 90 whose output is connected via a switch 92 to a sample averaging means 94, the switch 92 being controlled in response to an End of STOP Pulse provided on a line 95 at the end of each vehicle stop. It should be pointed out, however, that the block diagrams showing the long term adaptive constant being derived from decleration error are an attempt to illustrate in simple terms what in practice would be achieved with software.

By way of example, the integrator 90 of FIG. 3 can be simulated by a digital computer using an accumulating memory location which receives the addition of processed deceleration errors at regular present intervals. The integrator can be reset at any point in time, to a preset starting point such as unity, or a scaled value representing unity. The integral correction developed at the end of any stop (or at the low speed point at which the correction changes are discontinued) can be determined by calculation of the difference between the integrator final reading and the stored integrator start figure.

Thus at the end of each stop, the integrating location can be reset to the stored integral start figure. This may be a preset base figure or may alternatively be a progressive figure formed from the previous integral start level plus a percentage of the integral correction developed during the stop. If this is the case, the store integrator start figure is changed after each stop and control is thereby adapted to suit braking conditions.

An accumulation of similarly derived figures on each stop is formed and is processed in the very slow integrating means 90 to generate the adaptive constant C, assessed over a sizeable series of vehicle stops. This adaptive constant has a nominal or start value of unity and is gradually modified to correct changing brake conditions between stops. This constant is therefore a good indication of brake condition and is regularly updated within the controller and stored in electrically alterable non-volatile computer memory to provide, at start up or on demand, a brake performance factor via a diagnostic output port 96.

When a vehicle equipped with such an electronic brake control system (EBS) is adapted for towing a standard trailer, i.e. one not so equipped with its own EBS system, then the brake demand signalling to the trailer is in the form of a pneumatic pressure signal which is provided by the EBS system on the towing vehicle. For this purpose, in addition to the basic components mentioned above, the present system also includes a sub-system comprising a separate relay valve 44 (FIG. 1) for supplying a pneumatic signal to the trailer brakes (not shown) via a trailer service air supply pipe 46 under the control of a trailer brake controller unit 48. The trailer brake demand pressure may be adjusted to suit the trailer load as assessed on the towing vehicle by processing the signal from a load sensor 50 and to compensate for the operating gradient which is measured by the EBS system. The load sensor 50 is disposed in the coupling link (not shown) between the towing vehicle and the trailing vehicle and can be of the same general type as used in EP 301018. In addition to the trailer brake being applied when there is a driver's foot demand signal, or in either of the towing vehicle braking circuits if there is more than one. Generation of a pneumatic trailer brake signal will also occur when the parking brake of the towing vehicle is applied.

The braking circuitry of an axle-controlled EBS vehicle shown in FIG. 1 is thus provided with an extension to its pneumatic circuit and to its electronic control system in order to provide a suitable trailer brake control channel compatible with current trailer systems. The conventional truck EBS, for example, is a split system having regard to both its pneumatic circuits and to its electronic control provisions in order to comply with existing safety standards. The brake pedal transducers, the controller and power supplies are duplex and the pneumatic circuits are separate and individual for each axle. These principles are continued when the trailer supply subsystem is added in that the relay valve 44 for the trailer supply is fed via pipework 52 from its own trailer supply reservoir (not shown), the latter valve 44 having either an integrated or a separate control element which accepts the inverse air parking brake signal via a line 54 to convert this to a trailer brake signal in the line 46. This trailer brake control system is fed with signals direct from each of the two (duplex) brake pedal transducers, in parallel with the feeds to each axle control channel and the whole trailer braking circuit is fed with battery power from both main and auxiliary batteries in order that this sub-system will maintain trailer operational control in the event of either axle system failing.

Like the main braking system described above, the sub-system for the trailer brakes is also subjected to adaptive compensation. Thus, the trailer channel controller 48, which sets the trailer braking pressure in line 46 from the driver's braking demand, is optionally compensated for trailer load being carried and for the operating gradient of the vehicle/trailer combination (as sensed at the towing vehicle).

Figure 4:
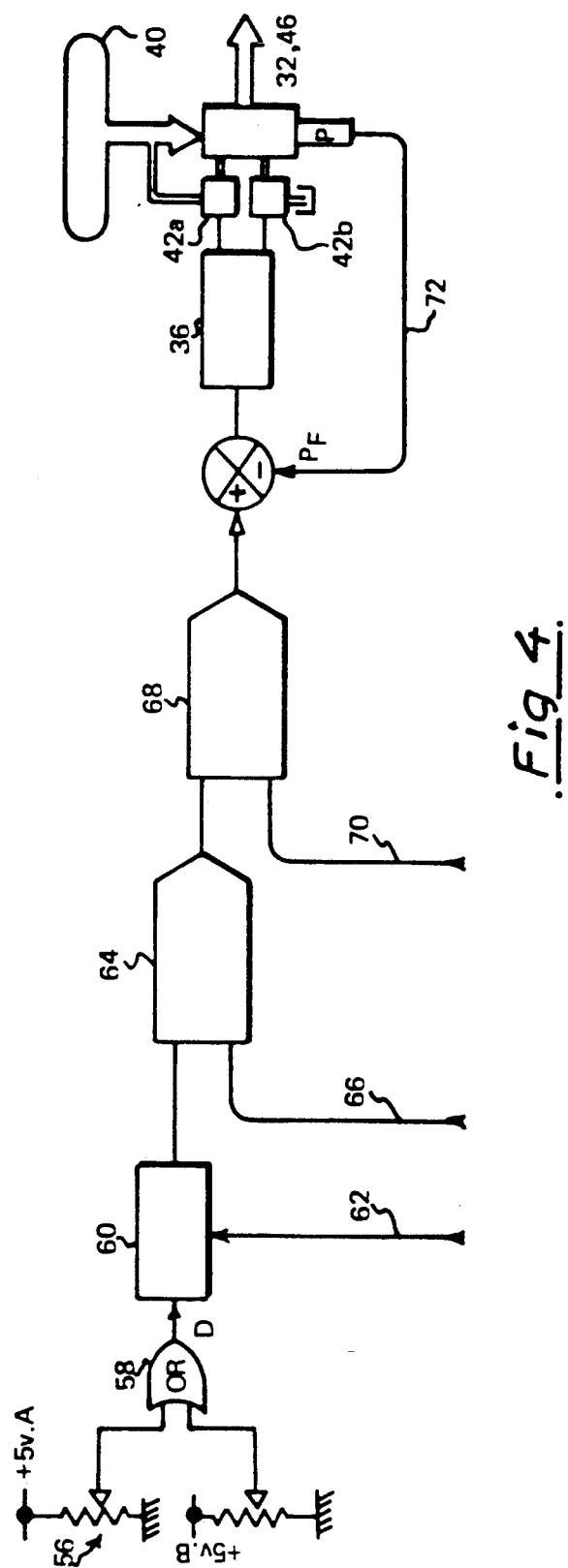
FIG. 4 is a schematic view of one embodiment of a trailer braking controller used in the system of FIG. 1.

The trailer brake controller unit 48 is illustrated in more detail in FIG. 4. Driver's input from a duplex pedal assembly 56 produces a driver's demand signal D by way of an OR gate 58. The demand signal D is first compensated for operating gradient in a gradient compensation element 60 which receives an input signal from the towing vehicle system on line 62 representative of the prevailing road gradient. The compensated demand signal is then modified for trailer mass which is either measured (see FIG. 9 discussed hereinafter) or assumed to be full load. The assumption for full load is to take account of the trailer being fitted already with a pneumatic load-conscious valve. In the latter case, a full load value air signal would be sent to the trailer which would then be controlled by the fitted apportioning valve(s). Modification for trailer mass is achieved in a load multiplier 64 which receives as one input, on a line 66, a signal representative of trailer mass or assumed full load value. The gradient-compensated and load-multiplied demand signal is then passed on to a "scaling multiplier" 68 whose function is to introduce, via a line 70, either a trailer adaptive variable or an array of such variables, based upon the trailer coupling load but using the same principles as for the adaptive array described hereinbefore with reference to FIG. 10. The scaled signal is then operated on by a pressure feedback signal $P_F$ on a line 72 to produce an operating signal for the pressure controller 36 see FIG. 2). The output of the pressure control loop 30, controlled by the pressure controller 36, provides the pneumatic signal for the trailer brakes in conduit 46.

Thus, the trailer channel controller 48 sets the trailer braking pressure in line 46 from the driver's braking demand, compensated for operating gradient and optionally being compensated for trailer load being carried and for the operating gradient of the vehicle/trailer combination (as sensed at the towing vehicle). The controller 48 also has an input from the force sensor 50 which measures the pushing or pulling load on the trailer towing link, by sensing a fixture which is attached to the towing vehicle. This signal is used as a further factor in the regulation of trailer overall braking wherein electronic processing of this signal combined with the demand, load and gradient factors, sets up a service line braking pressure in conduit 46 of such a level as to hold the trailer braking application at a point where, as described further hereinafter, there is exerted a slight preset tension in the towing link which improves the stability of the towing vehicle/trailer combination.

In this system, no signals are measured on the trailer, since the trailer may have no electronic equipment or even permanent power, so that the trailer mass is assessed from measurements of towing link tension during acceleration. The trailer brake demand is calculated using this mass, the driver's braking demand and an assumed or adapted constant representing the trailer brake factor overall.

Trailer mass is calculated using the detector shown in FIG. 9. A vehicle acceleration signal on a line 110 and a trailer coupling tensile load signal on a line 112 are divided in a divider 114 and the result passed, via a switch 116, to a mass store 118. The switch 116 is only opened by a selector 120 on receipt of (a) a vehicle speed signal on a line 122 showing that the vehicle speed lies between two preset speeds, for example 5 mph-20 mph, (b) a sensibly zero gradient signal on a line 124 indicative of the road gradient being substantially zero, and (c) a vehicle acceleration signal on line 110 showing that the acceleration has been for example >0.1 g for at least 2.5 seconds. A signal representative of trailer mass is output on line 126.

The trailer brake factor is a constant which is adapted on the basis of a feedback signal generated from the towing link measurement and, like the adaptive factor for the towing vehicle brakes, is designed to be established over a series of braking stops. After this sequence, the adaptive constant can be used to provide a measurement of the trailer brake overall efficiency.

The combination of EBS equipped towing vehicle and unequipped trailer as described above has the towing vehicle mass assessed from axle load measurements and the adaptive loop on the towing vehicle is active in adjusting the ratio of braking pressures to driver demand in order to maintain the expected vehicle deceleration response. An allowance is made in this system for the load being exerted on the towing vehicle by the trailer. If the trailer braking level is correctly set so as to maintain a small tension level in the towing link, then this tension will be assisting the towing vehicle braking. Tension measurement allows the adapted brake factor figure to be offset so that the towing vehicle brakes do not appear to be better than is the case. The system should adapt the towing vehicle braking to make allowance for the trailer overbraking which generates link tension. However, if this tension is absent or replaced by a thrust from the trailer, the towing vehicle will adapt to increase braking which would be incorrect since the trailer demand will be adapted also and the towing vehicle would have to be re-adapted back. Thus if the link load measurement shows the trailer braking to be incorrect, the towing vehicle adaptive loop is adjusted by this measurement to reduce the deceleration error by introducing a force/mass term which adds to the vehicle deceleration figure when correctly scaled.

This allows the trailer adaptive loop to operate and correct the vehicle braking whilst bringing the towing link load into the correct tension region at the same time. If on the other hand, the towing vehicle is not contributing an adequate share of the total retardation effort, then two factors will be apparent in combination. The towing link will be in compression and the overall train deceleration will be lower than the demand. Occurrence of these two signals simultaneously prevents the trailer braking demand being reduced by any significant level, yet causes the towing vehicle braking contribution to be adapted upwards, increasing the braking demands on the vehicle.

Where both vehicles have poor brakes, the towing link measurement will show low values of loading whilst the vehicle decelerometer will indicate that retardation targets are not being met. In such circumstances the towing vehicle and trailer demand systems are both adapted upwards to boost braking. Therefore the towing vehicle and trailer demand systems have adaptive loops which co-operate together on the basis of signals from both the towing vehicle decelerometer and the towing link, which are interpreted in conjunction.

Figures 5, 6:
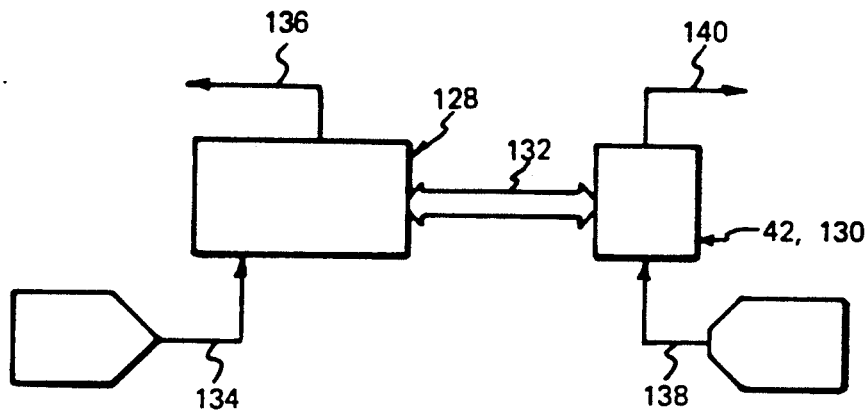
FIG. 5 is a block circuit diagram showing two adaptive control loops used in the present system.
FIG. 6 is a Table illustrating possible braking error combinations and the action taken by the system to obtain correction.

FIG. 5 is a schematic diagram showing the towing vehicle adaptive loop 128 and trailer adaptive loop 130 and also the data exchange path 132 necessary between the two loops since deceleration signals are required in the trailer loop 130 and link load allowance signals are required in the towing vehicle adaptive loop 128 to prevent this being adjusted for errors which are currently apparent on the trailer system. The towing vehicle adaptive loop has a "vehicle deceleration" error input on a line 134 and the "towing vehicle adaptive constant" output on line 136. The trailer adaptive loop has the "towing link load" input on a line 138 and the "trailer brake adaptive constant" output on a line 140. The data exchange path 132 is shown in more detail in FIG. 7 described hereinafter.

As will by now be apparent, the control loop for the trailer brakes incorporating the controller arrangement illustrated in FIG. 4 is adapted, in the same manner as described above for the towing vehicle, except that the vehicle deceleration is not used as the input signal. Thus, whereas the deceleration error, modified as described below via the data exchange path 132 (FIG. 5) is used to adapt the towing vehicle braking levels, the coupling load signal from the sensor 56 is used to derive the input (error) signal for adaptation of trailer braking. In the ideal braking distribution between towing vehicle and trailer, the error signal from the coupling link should be virtually zero and so the adaptive loop for the trailer brakes is arranged to seek to achieve this condition by adjustment of corresponding trailer braking levels over a series of significant stops.

To prevent interaction between the two adaptive loops 128, 130, since both are being adjusted simultaneously, requires that allowances are made in the error formation of each adaptive channel so that adjustments are co-ordinated rather than interactive, thereby improving response.

As mentioned above, if trailer braking is below the expected level, two factors will be apparent. The overall deceleration for the combined vehicle will be low and the coupling load will be reading compression. This combination is an indication of trailer underbraking and will be interpreted as such by acceptance of the deceleration shortfall as the result of the trailer deficiency whilst the coupling load signal will be accumulated to adapt the trailer braking to give an increase of braking on subsequent stops until the coupling load is gradually reduced to zero.

The measurement of trailer coupling force is used to calculate an allowance which is to be made in the assessment of satisfactory towing vehicle braking performance. This is achieved by dividing trailer coupling force by towing vehicle mass as obtained from the axle load sensors, to yield an expected acceleration error. This signal is introduced into the towing vehicle adaptive loop deceleration error calculation as an allowance for the trailer disturbance and, as shown in the table of FIG. 6 (which tables the possible braking error combinations and the remedial action which will be taken in order to correct trailer compatibility first and overall vehicle retardation subsequently) adjustment is not made on the towing vehicle for errors which will be corrected by adapting trailer braking so as to reduce the trailer coupling load signal to a low level. The towing vehicle adaptive brake adjustment loop is driven from deceleration error defined as:

Deceleration Demand − Actual deceleration −

$$\frac{\text{Compression Force}}{\text{Towing Vehicle Mass}}$$

This is achieved, as shown in FIG. 7, by introducing to a divider 142 a "towing vehicle mass" signal on a line 144 and the trailer coupling load by way of the line 106 and a line 146. The resulting quotient is introduced via line 143 to a subtracting element 148 where it is subtracted from the deceleration error $F_E$.

Now taking the case where the towing vehicle braking is seriously impaired which results in the overall vehicle deceleration being low but the coupling load measurement is in substantial tension. The trailer braking is adapted on the basis of trailer coupling force, which should eventually be reduced to zero. This would, without modification, cause incorrect reduction in trailer braking unless an allowance is made for the low deceleration of the vehicle. The deceleration error formed from demand—actual deceleration is multiplied by the trailer mass to generate a force allowance which is subtracted from the coupling tension, drastically reducing the trailer brake adaptation which would otherwise have taken place.

This is achieved, as shown in FIG. 7, by introducing to a multiplying element 150 the trailer mass signal on a line 152 and the deceleration error $F_E$ on a line 154, the result being directed to a subtracting element 156 where it is subtracted from the trailer coupling load signal present on line 106.

However, in some cases the trailer mass figure may not have been calculated so that the above allowance cannot be made. In this case an alternative strategy is adopted which uses the logic circuit of FIG. 8 to inhibit the trailer adaptive loop. This logic circuit detects the conditions under which trailer adjustment on prevailing coupling load signals, would be wrong. The circuit detects the combination of either:

(a) the coupling being in tension and actual deceleration being low, or (b) the coupling being in compression and actual deceleration being high. In either case, the logic circuit causes the trailer brake adaptive control loop to be switched off.

Figure 8:
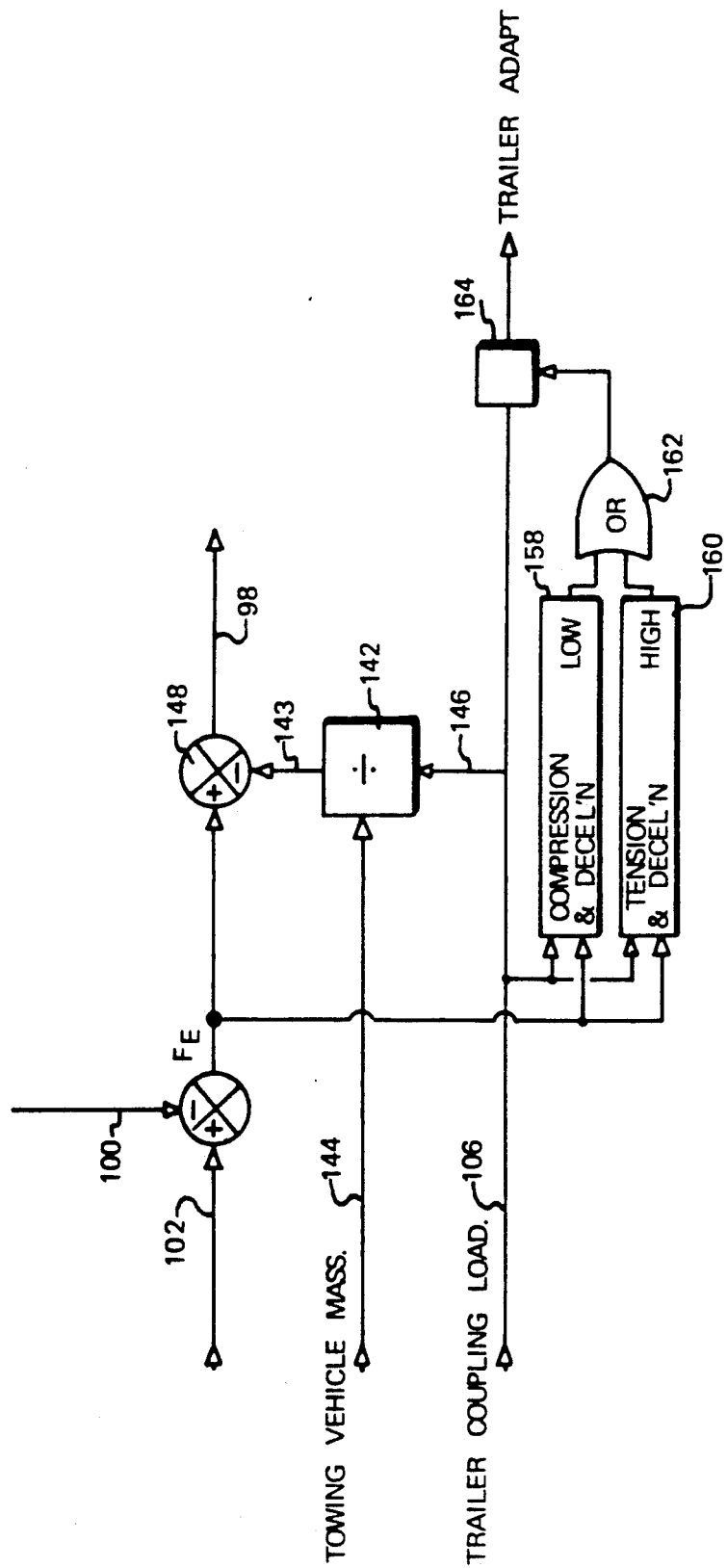
FIG. 8 shows more detail of a second possible embodiment of the two adaptive control loops of FIG. 5.

This is achieved as shown in FIG. 8 in that, whereas the components and arrangements associated with the establishment of the towing vehicle adaptive constant are identical to those of FIG. 7, the deceleration error signal and trailer coupling load are both connected to the inputs of the two comparators 158,160. The comparator 158 responds to the condition that the coupling is in compression and the deceleration error is positive and the comparator 160 responds to the condition that the coupling is in tension and the deceleration error is negative. The comparator outputs are fed via an OR gate 162 to the control input of a switch 164 which selectively switches on the trailer adaptive constant in the event of either one or other of the comparators being triggered.

Finally, where a towing vehicle changes trailers, the conditions which were established by adaptive adjustment of the brake control systems may well be changed and the trailer demand system would be in error. Two provisions for dealing with this situation are possible. Firstly, the driver can be provided with a simple electrical key to provide a "New Trailer Signal". Uncoupling the trailer is always accompanied by a towing vehicle movement even if another trailer is coupled up at the same site. This involves both acceleration and deceleration of the towing vehicle alone, as it moves between trailers, and it therefore provides the movement without generating and coupling load input. A similar manoeuvre with even an unloaded trailer connected would generate a detectable coupling load signal which serves to set a "trailer connected" flag.

Movement of the trailer unit without generating any trailer coupling load signal causes the flag to reset. Either this flag condition or the key is the signal used to clear the adaptive variable or array back to a starting or default level, installed when the initial system is configured. Thus, the system reverts back to nominal braking levels on the assumption of normal standard brakes. Alternatively, the adaptive control in the trailer demand channel is allowed to adapt back towards a level which suits the new trailer. The rate of change of adaptive parameters will be set high if the trailer braking system shows significant errors in either direction when the new trailer is first braked. Thus for very large errors in trailer braking where quite significant towing link loads are generated, the adaptive constant will be changed in ramp fashion during the course of a stop rather than waiting for the more normal inter-stop adjustment accepted for smaller errors.

We claim:

1. An electronic braking system in a motor vehicle capable of towing a standard trailer having brake actuators on at least one set of trailer road wheels but not having its own on board electronic braking system comprising:

a separate pressure control channel responsive to a driver's braking demand signal on the towing vehicle for the generation of a trailer service brake pressure signal in the event that said driver's braking demand signal is sensed at any axle of said towing vehicle, a towing link carried by said towing vehicle and constructed and arranged to be engaged by a trailer, load measuring means associated with said link for measuring load exerted by a trailer on said towing vehicle, means on the towing vehicle for setting a trailer service brake pressure signal level in the towing vehicle so as to be a function of said driver's demand signal modified in dependence upon a load exerted by a trailer on the towing vehicle as measured at said towing link, and separate adaptive loop means provided in respect of towing vehicle braking and in respect of trailer braking, respectively, said towing vehicle adaptive loop means being responsive to a deceleration error signal established by a comparison of vehicle retardation against said driver's braking demand signal, and said trailer adaptive loop being responsive to towing link load, such as to obtain error signals which are arranged to cause adaptive adjustments to be made in said two loops in a mutually co-ordinated manner in order to achieve the required overall vehicle retardation.

2. An electronic braking system according to claim 1, said system including a memory and means in said trailer adaptive loop for multiplying the trailer service brake pressure demand by a trailer brake factor stored in said system memory and adapted to be adjusted, over a series of stops, from a preset nominal value so as to generate a level of trailer braking on subsequent stops in which the towing link is maintained at a preset load condition, the adjustment of said trailer brake factor being made in conjunction with adaptive adjustment to said towing vehicle adaptive loop so that both loops are adjusted to give required vehicle retardation in addition to required braking distribution between said towing vehicle and trailer.

3. An electronic braking system according to claim 2 wherein said required braking distribution corresponds to there being a slight tension in said towing link between the towing vehicle and the trailer.

4. An electronic braking system according to claim 1, including means responsive to said error signals for causing adaptive adjustments to be made in a coordinated manner in said loops so as to obtain trailer braking ratio adjustments, said error responsive means including means for inputting into the towing vehicle's adjustment loop an allowance for the trailer braking force as an expected retardation error, and means for then adjusting both loops when the towing link loads are sensibly correct in order to achieve the required overall vehicle retardation.

5. An electronic braking system according to claim 4 including means responsive to load on said towing link in excess of a predetermined load for producing a signal indicative of excessive imbalance between trailer and towing vehicle braking levels, and means responsive to said excessive load signal to cause immediate adjustment of an appropriate adaptive loop during one stop to effect a substantial balance in said braking levels in lieu of normal adjustments over several stops.

6. An electronic braking system according to claim 1 wherein, for use in cases where there is a severe non-linearity between braking torque and brake actuator pressure, there is established in one or both of the adaptive loops a predetermined array of adaptive constants for achieving said adaptive adjustments, the variation in the adaptive constants in said array being based on vehicle speed and deceleration.

7. An electronic braking system according to claim 1 wherein said means for coordinating said two adaptive loops comprises means for deriving a first signal representative of the towing link load divided by the towing vehicle mass, means for subtracting said first signal from an acceleration error signal used to form the towing vehicle adaptive signal, means for deriving a second signal representative of the trailer mass multiplied by said deceleration error signal, and means for subtracting said second signal from the towing link load signal used to form the trailer adaptive signal.

8. An electronic braking system according to claim 1 wherein means for coordinating said two adaptive loops comprises means for deriving a first signal representative of the towing link load divided by the towing vehicle mass, and means for subtracting said first signal from an acceleration error signal used to form the towing vehicle adaptive signal, means for forming the trailer adaptive loop signal from said towing link load and means for suspending formation of said trailer loop signal from said towing link load when either (a) the towing link is in compression and the measured deceleration is below a predetermined level of deceleration or (b) the towing link is in tension and the measured deceleration is above a predetermined level of deceleration.

9. An electronic braking system in a motor vehicle capable of towing a standard trailer having brake actuators at at least one set of trailer road wheels but not having its own on board electronic braking system, said system comprising a separate pressure control channel responsive to a driver's electrical braking demand signal for the generation of a trailer service brake pressure signal in the event said driver's electrical braking demand signal is sensed at any axle of the towing vehicle, a towing link carried by said towing vehicle and adapted to be engaged by a trailer, load measuring means associated with said link for measuring load exerted by a trailer on said towing vehicle, means on the towing vehicle for setting the trailer service brake pressure signal level as a function of said driver's electrical braking demand signal modified in dependent upon the load exerted by the trailer on the towing vehicle as measured at said towing link therebetween, and means for achieving required overall retardation for the motor vehicle and trailer combination comprising a first adaptive loop for towing vehicle braking and a second separate adaptive loop for trailer braking, first transducer means for detecting vehicle retardation, second transducer means for generating an electrical signal representative of driver braking demand, third transducer means for detecting the load in said towing link between the motor vehicle and the trailer, said first adaptive loop receiving a deceleration error input signal established by the comparison of vehicle retardation and driver braking demand from said first and second transducer means, said second adaptive loop receiving a towing link load input signal from said third transducer means, and a data exchange path connecting both adaptive loops, said data exchange path including an inter connection between said third towing link load transducer means and said first adaptive loop for towing vehicle braking, and a further inter connection between said second driver braking demand transducer means and said second adaptive loop for trailer braking.

* * * * *